United States Patent
Douglas et al.

(10) Patent No.: US 12,350,841 B2
(45) Date of Patent: Jul. 8, 2025

(54) VACUUM CUP DAMAGE DETECTION SYSTEM

(71) Applicant: Material Handling Systems, Inc., Mt. Washington, KY (US)

(72) Inventors: Josiah Douglas, Louisville, KY (US); Kristiyan Rosenov Georgiev, Louisville, KY (US); Robert D. Haller, Georgetown, IN (US); Thomas Anthony Hillerich, Jr., Louisville, KY (US); Paul Receveur, New Albany, IN (US)

(73) Assignee: FORTNA Systems, Inc., Mt. Washington, KY (US)

( * ) Notice: Subject to any disclaimer, the term of this patent is extended or adjusted under 35 U.S.C. 154(b) by 613 days.

(21) Appl. No.: 17/872,130

(22) Filed: Jul. 25, 2022

(65) Prior Publication Data

US 2023/0025083 A1    Jan. 26, 2023

Related U.S. Application Data

(60) Provisional application No. 63/225,720, filed on Jul. 26, 2021.

(51) Int. Cl.
 *B25J 9/16* (2006.01)
 *B25J 9/00* (2006.01)
 (Continued)

(52) U.S. Cl.
 CPC .......... *B25J 9/1674* (2013.01); *B25J 9/0093* (2013.01); *B25J 9/1694* (2013.01); *B25J 13/085* (2013.01);
 (Continued)

(58) Field of Classification Search
 CPC ...... B25J 9/1674; B25J 9/0093; B25J 13/085; B25J 13/087; B25J 15/0052;
 (Continued)

(56) References Cited

U.S. PATENT DOCUMENTS 6,024,392 A * 2/2000 Blatt .................... B25B 11/007
                                                            294/185
6,086,321 A * 7/2000 Takahashi ............. B25J 9/1612
                                                            414/793

(Continued)

FOREIGN PATENT DOCUMENTS

CA        2807595 A1 * 5/2013 .......... B25J 15/0616
JP      H05-47898 A    2/1993
 (Continued)

OTHER PUBLICATIONS

Korean Intellectual Property Office, International Search Report and Written Opinion issued in corresponding Application No. PCT/US2022/038132, mailed Nov. 15, 2022.

(Continued)

*Primary Examiner* — Thomas Randazzo
(74) *Attorney, Agent, or Firm* — Stites & Harbison, PLLC; David W. Nagle, Jr.; Gary N. Stewart

(57) ABSTRACT

A vacuum cup damage detection system detects vacuum cup damage or absence in a robot singulator including a vacuum-based end effector with one or more vacuum cups. The system generally comprises a plate and a control subsystem. The plate provides a potential point of engagement for the one or more vacuum cups of the vacuum-based end effector when the robot singulator is moved to a predetermined position in which, if present, at least one of the one or more vacuum cups of the vacuum-based end effector is in contact with the plate. The control subsystem includes: one or more sensors configured to obtain readings indicative of the engagement of the one or more vacuum cups with the plate (Continued)

or lack thereof; and a controller configured to determine whether any one of the vacuum cups is damaged or missing based on the readings obtained by the one or more sensors.

24 Claims, 8 Drawing Sheets

(51) Int. Cl.
*B25J 13/08* (2006.01)
*B25J 15/00* (2006.01)
*B25J 15/06* (2006.01)
*B65G 43/08* (2006.01)
*B65G 47/26* (2006.01)
*B65G 47/91* (2006.01)
*B65G 61/00* (2006.01)

(52) U.S. Cl.
CPC ......... *B25J 13/087* (2013.01); *B25J 15/0052* (2013.01); *B25J 15/0616* (2013.01); *B65G 43/08* (2013.01); *B65G 47/26* (2013.01); *B65G 47/917* (2013.01); *B65G 61/00* (2013.01); *B65G 2203/041* (2013.01)

(58) Field of Classification Search
CPC .. B25J 15/0616; B25J 9/1612; B25J 19/0095; B25J 19/023; B65G 43/08; B65G 47/26; B65G 47/917; B65G 61/00; B65G 2203/041; B65G 2203/0208; B65G 2203/042; B66C 1/0218
See application file for complete search history.

(56) References Cited

U.S. PATENT DOCUMENTS

| 9,205,558 | B1 * | 12/2015 | Zevenbergen ......... B25J 9/1664 |
| 10,646,898 | B2 | 5/2020 | Hillerich, Jr. et al. |
| 10,994,309 | B2 | 5/2021 | Hillerich, Jr. et al. |
| 11,203,493 | B2 | 12/2021 | Berg et al. |
| 11,241,802 | B2 | 2/2022 | Douglas et al. |
| 11,285,605 | B2 | 3/2022 | Douglas et al. |
| 2009/0066098 | A1 | 3/2009 | Subotincic |
| 2011/0166704 | A1 | 7/2011 | Hashimoto |
| 2014/0195053 | A1 | 7/2014 | Subotincic |
| 2017/0096308 | A1 | 4/2017 | Girtman et al. |
| 2019/0090964 | A1 * | 3/2019 | Rosenberg ............... B25J 5/007 |
| 2020/0262069 | A1 * | 8/2020 | Douglas ............... B65G 47/918 |
| 2021/0221002 | A1 | 7/2021 | Bader et al. |
| 2021/0395023 | A1 | 12/2021 | Patil et al. |
| 2022/0315358 | A1 * | 10/2022 | Ryan ..................... B25J 9/1697 |
| 2023/0150777 | A1 * | 5/2023 | Skyum ..................... B07C 5/02 |
| | | | 700/245 |

FOREIGN PATENT DOCUMENTS

| JP | 2000-159472 A | 6/2000 |
| WO | 2016-010968 A1 | 1/2016 |

OTHER PUBLICATIONS

European Patent Office, Supplementary Partial European Search Report issued in corresponding Application No. 22850124.3 dated May 28, 2025.

* cited by examiner

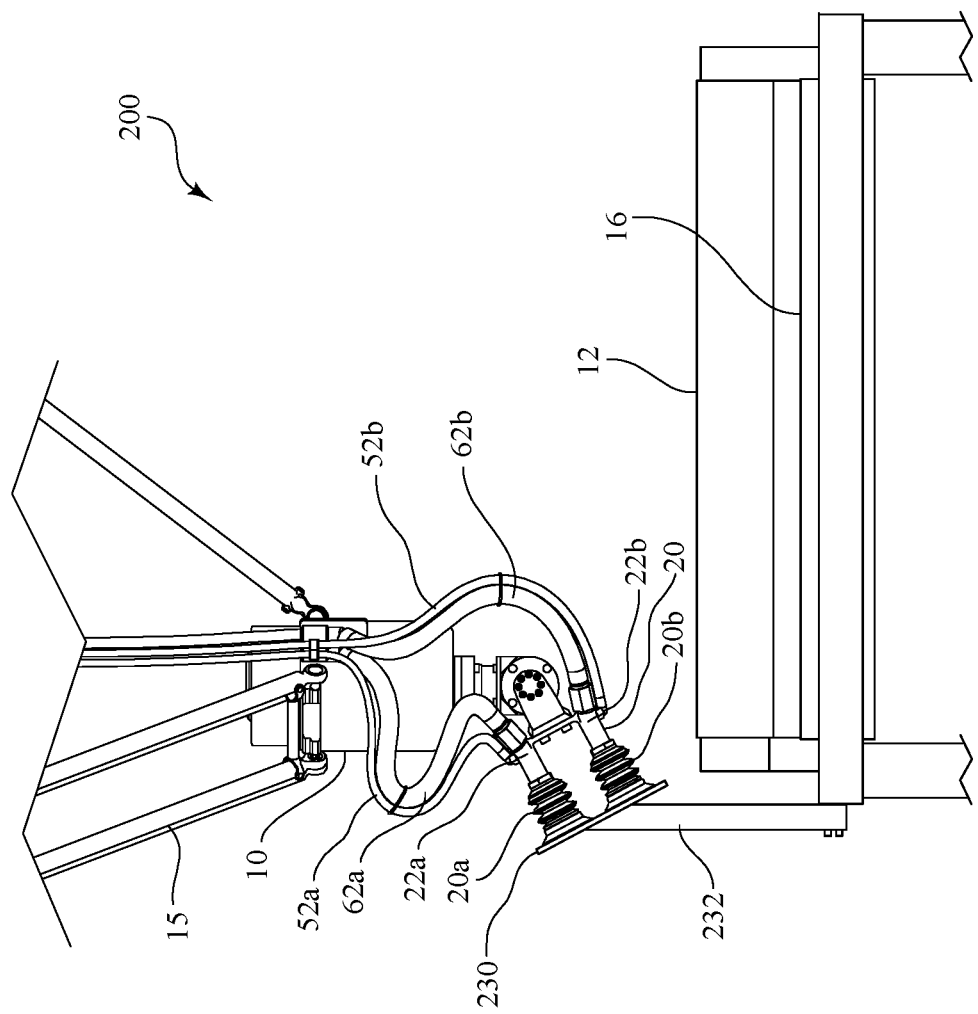

VACUUM CUP DAMAGE DETECTION SYSTEM

CROSS-REFERENCE TO RELATED APPLICATIONS

The present application claims priority to U.S. Patent Application Ser. No. 63/225,720, filed on Jul. 26, 2021, the entire disclosure of which is incorporated herein by reference.

BACKGROUND OF THE INVENTION

The present invention relates to the handling of parcels within a sorting or similar facility.

In a sorting facility for parcels, various parcels are unloaded from trucks or other vehicles at unloading locations, sorted, and then loaded onto trucks or other vehicles at loading locations for delivery to the intended recipients. Thus, within the sorting facility, there is often a complex system of conveyors and equipment that facilitates transport and sorting of the parcels within the facility. One such piece of equipment useful for sorting the various parcels is a robot singulator, including a robotic framework (comprised of one or more arms) and an end effector, such as a vacuum-based end effector, that is mounted to the distal end of the robotic framework and configured to engage parcels. In this regard, a number of different robot singulators exist in the art, one of which is disclosed in commonly assigned U.S. Pat. Nos. 10,646,898 and 10,994,309, which are incorporated herein by reference.

Vacuum-based end effectors typically include one or more vacuum cups, where each vacuum cup is configured to engage and form a seal with a target parcel. The seal formed between each respective vacuum cup and the target parcel enables a suction force to be applied to the target parcel as a vacuum is drawn through the respective vacuum cups, thereby, in turn, enabling the end effector to grasp and transfer the target parcel. After periods of prolonged use, however, the vacuum cups of these end effectors can degrade or fall off. In either case, the ability of the end effector to engage and transport parcels is diminished, if not entirely compromised. Without immediate detection and repair, the end effector may run for prolonged periods of time, thus hindering sorting efficiency.

Accordingly, a system for detecting vacuum cup damage in a robot singulator including a vacuum-based end effector would be both desirable and beneficial.

SUMMARY OF THE INVENTION

The present invention is a vacuum cup damage detection system (or damage detection system) for detecting vacuum cup damage or absence in a robot singulator including a vacuum-based end effector configured to carry one or more vacuum cups.

The damage detection system includes a plate and a control subsystem. The plate provides a potential point of engagement for the one or more vacuum cups of the vacuum-based end effector when the robot singulator is moved to a predetermined position, which corresponds to a position in which, if present, at least one of the one or more vacuum cups of the vacuum-based end effector is in contact with the plate. The control subsystem is configured to determine whether any of the vacuum cups of the one or more vacuum cups carried or intended to be carried by the vacuum-based end effector are damaged or missing based on readings obtained while the robot singulator is in the predetermined position and/or moved away from the predetermined position. In this regard, the control subsystem includes: one or more sensors configured to obtain readings that are indicative of the engagement of the one or more vacuum cups carried by the vacuum-based end effector with the plate or lack thereof (i.e., non-engagement of the one or more vacuum cups with the plate); and a controller that is operably connected to the one or more sensors and configured to determine whether any one of the one or more vacuum cups is damaged or missing based on the readings obtained by the one or more sensors. In some embodiments, the controller is further operably connected to the robot singulator, such that the controller can receive readings obtained by and/or communicate instructions (signals) to affect the operation of the robot singulator.

In some embodiments, the one or more sensors comprise one or more vacuum sensors, with each vacuum sensor of the one or more vacuum sensors configured to obtain vacuum pressure readings. In other embodiments, the one or more sensors comprise one or more components of the robot singulator configured to provide feedback regarding a force imposed along or about one or more axes of the robot singulator as it is moved away from the predetermined position. In some embodiments, the one or more sensors comprise at least one of one or more load cells implemented in the robot singulator and one or more strain gauges implemented in the robot singulator.

As readings obtained by the one or more sensors can be adversely affected in instances where the application of a suction force supplied to the one or more vacuum cups is deficient (e.g., due to clogged vacuum lines or a malfunction in a vacuum source in fluid communication with the one or more vacuum cups), in some embodiments, the one or more sensors of the control subsystem also obtain readings while the robot singulator is not in the predetermined position. In one such embodiment, the controller is further configured to detect a deficiency in the operation of the vacuum source and/or the clogging within one or more pneumatic pathways corresponding to the one or more vacuum cups based on the readings obtained by the one or more sensors while the robot singulator is not in the predetermined position.

To detect objects present in the environment in which the robot singulator is operating, in some embodiments, the controller is operably connected to one or more cameras configured to acquire images of the plate, a pick conveyor from which the robot singulator, in use, removes parcels from, and/or a place conveyor on which the robot singulator, in use, deposits parcels. In one such embodiment, the controller is programmed to selectively communicate instructions which cause the robot singulator to move to the predetermined position based on the images received from the one or more cameras. In some embodiments, the one or more cameras are configured to capture images of the pick conveyor and the place conveyor and the controller is configured to determine whether parcels picked from the pick conveyor are subsequently deposited onto the place conveyor based on the images received from the one or more cameras. In one such embodiment, the controller is configured to communicate instructions which cause the robot singulator to move to the predetermined position subsequent to determining, based on the images received from the one or more cameras, that a predetermined number of parcels picked from the pick conveyor have not been transferred to the place conveyor. In some embodiments, the controller is configured to communicate instructions which cause the robot singulator to move to the predetermined position subsequent to determining, based on the images received from the one or more cameras, that no parcels are located on the pick conveyor. In some embodiments, the one or more cameras are configured to capture images of the plate and the controller is configured to communicate instructions which cause the robot singulator to move to the predetermined position subsequent to determining, based on the images received from the one or more cameras, the plate is clear of debris. In some embodiments, the plate is vertically oriented at a predetermined angle to prevent the buildup of debris on the plate.

In some embodiments, the control subsystem further includes at least one of a speaker operably connected to the controller and a display operably connected to the controller. In one such embodiment, the controller is configured to communicate an audible alert via the speaker and/or a visual alert via the display subsequent to determining, based on the readings obtained from the one or more sensors, that any one of the one or more vacuum cups is damaged or missing.

In some embodiments, the controller is further operably connected to one or more vacuum sources configured to be placed in fluid communication with the one or more vacuum cups carried by the vacuum-based end effector. In one such embodiment, the controller is configured to communicate instructions which selectively deactivate each vacuum source of the one or more vacuum sources that corresponds to a vacuum cup of the one or more vacuum cups determined, based on the readings from the one or more sensors, to be damaged or missing.

As the damage detection system can be utilized in combination with a robot singulator configured to transfer parcels from one conveyor to another conveyor, aspects of the present invention also relate to parcel transfer systems which include the damage detection system.

DESCRIPTION OF THE DRAWINGS

FIG. 3B is another front view of the system for transferring parcels of FIG. 3A, but with the robot singulator engaging the plate;

DETAILED DESCRIPTION OF THE INVENTION

The present invention is a vacuum cup damage detection system for a robot singulator including a vacuum-based end effector.

Figure 1A:
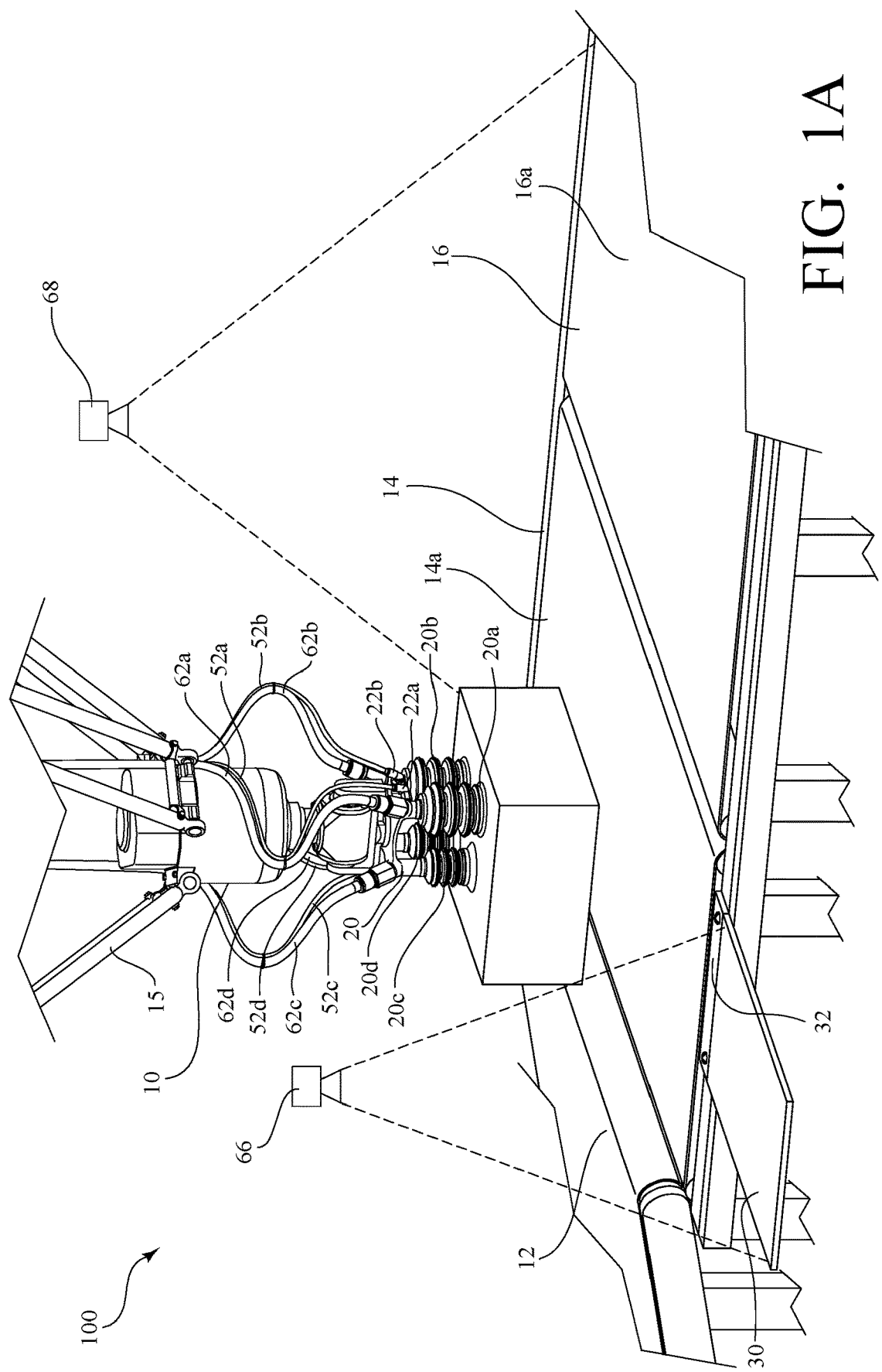
FIG. 1A is a perspective view of a system for transferring parcels, including a plate of an exemplary vacuum cup damage detection system made in accordance with the present invention.
Figure 1B:
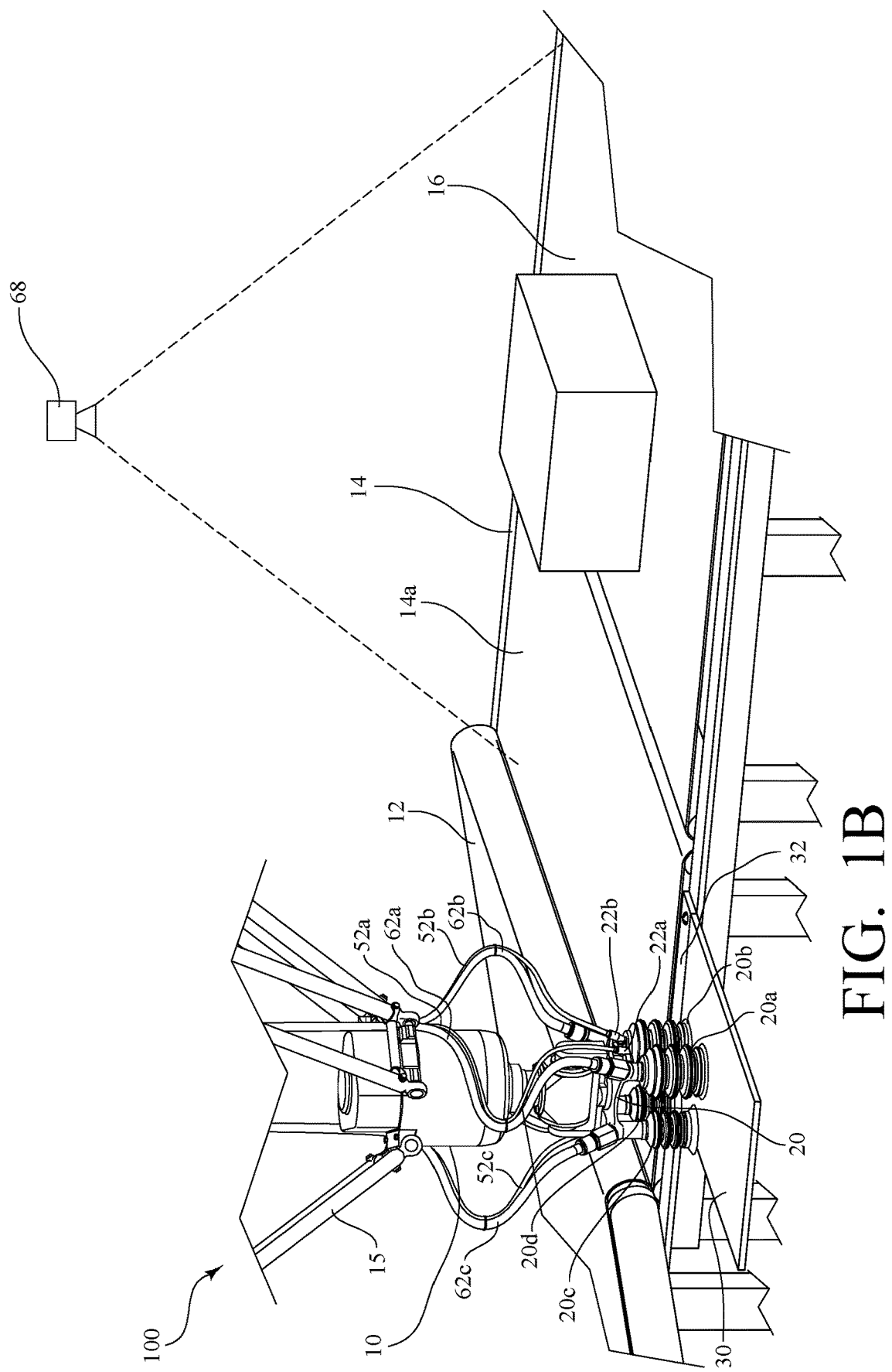
FIG. 1B is another perspective view of the system for transferring parcels similar to FIG. 1A, but with a robot singulator of the parcel transfer system positioned above the plate.
Figure 1C:
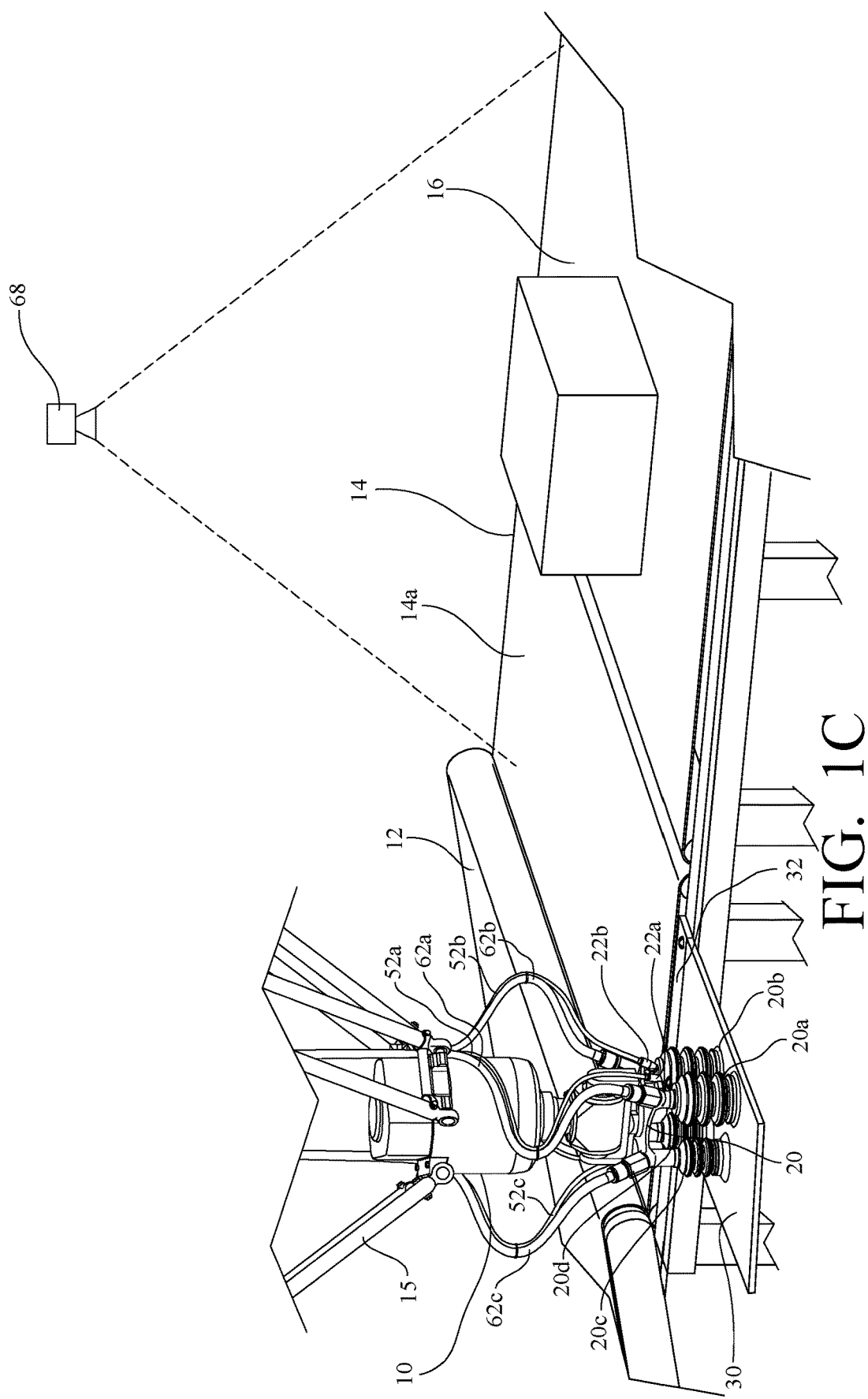
FIG. 1C is another perspective view of the system for transferring parcels similar to FIG. 1B, but with the robot singulator of the parcel transfer system engaging the plate.

FIGS. 1A-1C are multiple perspective views of a system for transferring parcels (or parcel transfer system) 100, including a plate 30 of an exemplary vacuum cup damage detection system (or damage detection system) made in accordance with the present invention.

Figure 2:
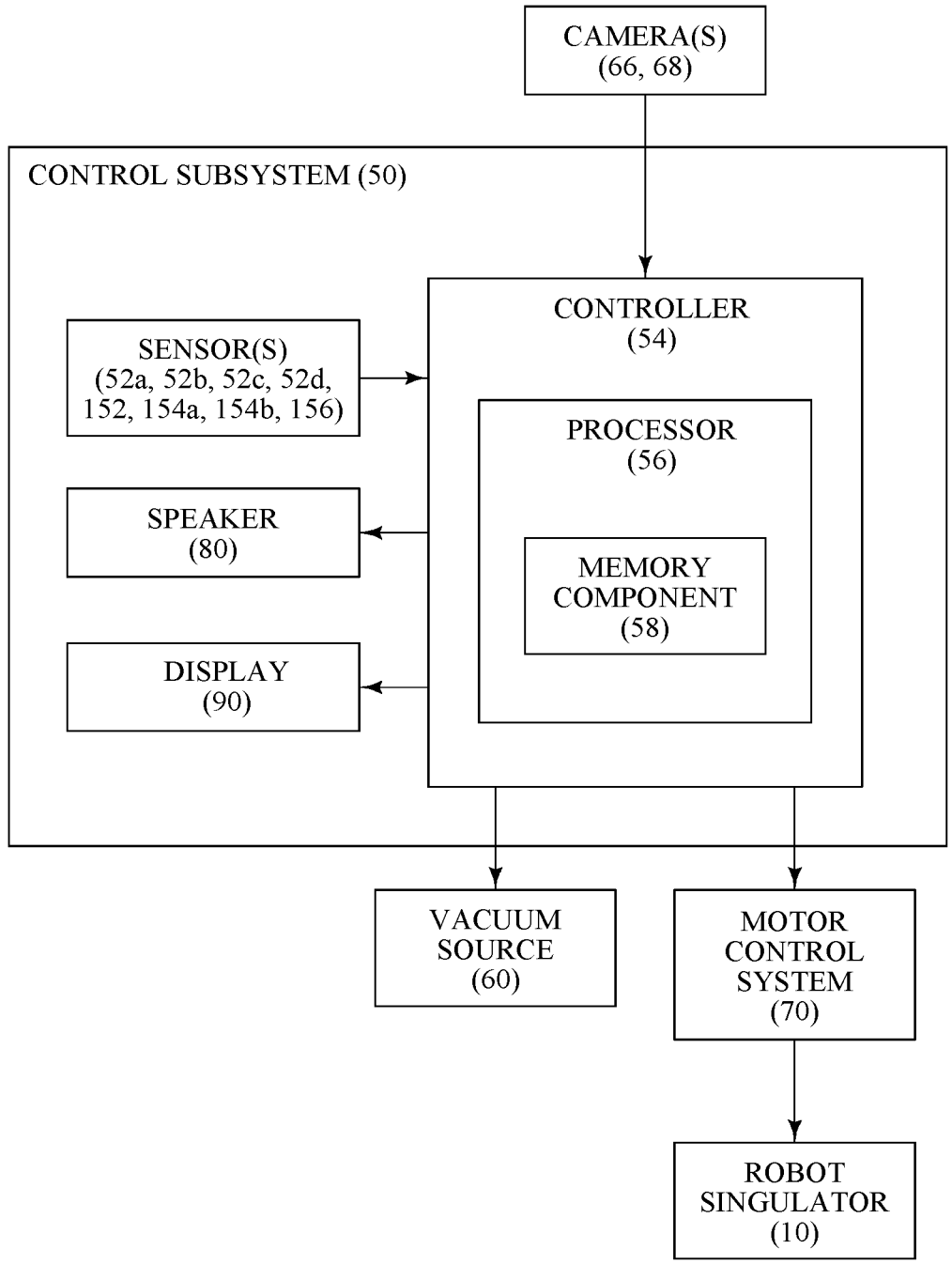
FIG. 2 is a schematic diagram of a control subsystem of the exemplary vacuum cup damage detection system.

As shown in FIGS. 1A-1C, the parcel transfer system 100 includes: an upstream conveyor 12, which, in this embodiment, is a destacking conveyor for conveying and destacking a bulk flow of parcels; a pick conveyor 14 positioned downstream of the upstream conveyor 12; a place conveyor 16 positioned downstream of the pick conveyor 14; a robot singulator 10 configured to selectively engage and transfer parcels from the pick conveyor 14 to the place conveyor 16; and an exemplary damage detection system made in accordance with the present invention, which includes the plate 30 and a control subsystem 50 (FIG. 2). As shown, the robot singulator 10 includes a repositionable framework 15 and a vacuum-based end effector 20 that is mounted to the framework 15 and is configured to carry one or more vacuum cups 20a, 20b, 20c, 20d. In this exemplary embodiment, the vacuum-based end effector 20 of the parcel transfer system 100 is configured to, and is, carrying four vacuum cups: a first vacuum cup 20a; a second vacuum cup 20b; a third vacuum cup 20c; and a fourth vacuum cup 20d. It is appreciated, however, that the damage detection system disclosed herein may be utilized with vacuum-based end effectors of alternative construction, including end effectors configured to carry less than or more than four vacuum cups, or end effectors which have some of their vacuum cups missing.

Suitable upstream conveyors, pick conveyors, place conveyors, robot singulators, end effectors, and vacuum cups with which may be used in the parcel transfer system 100 in which the damage detection system is implemented include, but are not necessarily limited to, those disclosed in: U.S. Pat. Nos. 10,994,309; 10,646,898; 11,203,493; 11,241,802; 11,285,605; U.S. Patent Application Publication No. 2020/0262069; U.S. Patent Application Publication No. 2021/0221002; and U.S. Patent Application Publication No. 2021/0395023, all of which are commonly assigned and incorporated herein by reference. However, the focus of the present application is on the damage detection system, which, again, includes the plate 30 and a control subsystem 50 (FIG. 2), as further described below.

It is important to recognize that, in the discussion that follows and in the claims of the present application, the term "parcel" is not intended to be limiting and can include any article, item, or object that may be loaded onto the disclosed parcel transfer system and transferred or otherwise processed in the manner specified within the present disclosure.

FIG. 2 is a schematic diagram of the control subsystem 50 of the exemplary damage detection system.

Referring now to FIGS. 1A-1C and 2, the damage detection system of the present invention is configured to detect damage to or the absence of vacuum cups intended to be carried by the vacuum-based end effector 20 during normal operation of the robot singular 10. To this end, and as noted above, the damage detection system generally includes: the plate 30 and the control subsystem 50. As shown best in FIG. 1B, the plate 30 provides a potential point of engagement for the vacuum cups 20a, 20b, 20c, 20d of the vacuum-based end effector 20 when the robot singulator 10 is moved to a predetermined position, which corresponds to a position in which, if present, at least one of the vacuum cups 20a, 20b, 20c, 20d of the vacuum-based end effector 20 is in contact with the plate 30 of the damage detection system. The control subsystem 50 is configured to determine whether any of the vacuum cups 20a, 20b, 20c, 20d of the vacuum-based end effector 20 are damaged or missing based on readings obtained while the robot singulator 10 is in the predetermined position and/or is moved away from the predetermined position, as further described below.

Referring now specifically to FIGS. 1B and 1C, in this exemplary embodiment, the plate 30 of the damage detection system is of sufficient dimension as to simultaneously accommodate each of the vacuum cups 20a, 20b, 20c, 20d of the vacuum-based end effector 20. The plate 30 is constructed of a material, such as stainless steel, which provides a good vacuum seal with the lips of the vacuum cups 20a, 20b, 20c, 20d of the vacuum-based end effector 20. In some embodiments, the plate 30 may be constructed of a material or include a surface which provides a visual indicator of wear. For instance, in one such embodiment, the plate 30 may include a disposable surface (not shown), such as a sheet or film, which defines the surface of the plate 30 with which the vacuum cups 20a, 20b, 20c, 20d, if present, engage while the robot singulator 10 is in the predetermined position, and which can be removed from the remainder of the plate 30.

Referring now again to FIGS. 1A-1C, during normal operation of the parcel transfer system 100, the robot singulator 10 iteratively engages parcels on the pick conveyor 14 and transfers them to the place conveyor 16 for further processing, as shown by viewing FIGS. 1A and 1B in sequence. To reduce the extent to which the robot singulator 10 must travel to the predetermined position for testing, and thus downtime associated therewith, the plate 30 is preferably mounted within close proximity to the pick conveyor 14 and/or the place conveyor 16 and outside of the areas in which the robot singulator 10 may travel while transferring a parcel from the pick conveyor 14 to the place conveyor 16 or returning from the place conveyor 16 to the pick conveyor 14. As shown, in this exemplary embodiment, the plate 30 is mounted adjacent to and resides along substantially the same plane as a picking surface 14a of the pick conveyor 14 on which parcels offloaded from the upstream conveyor 12 are received prior to transfer to the place conveyor 16. In this exemplary embodiment, the plate 30 is also rigidly mounted, in this case, via a bracket 32, to the pick conveyor 14, such that the plate 30 does not move as the robot singulator 10 is moved to the predetermined position and the vacuum cups 20a, 20b, 20c, 20d contact and engage therewith (FIG. 1C). Of course, the plate 30 can, in alternative embodiments, be mounted at different locations about the parcel transfer system or in a different orientation without departing from the spirit and scope of the present invention, as evidenced below, for example, with reference to FIGS. 3A and 3B.

Figure 3A:
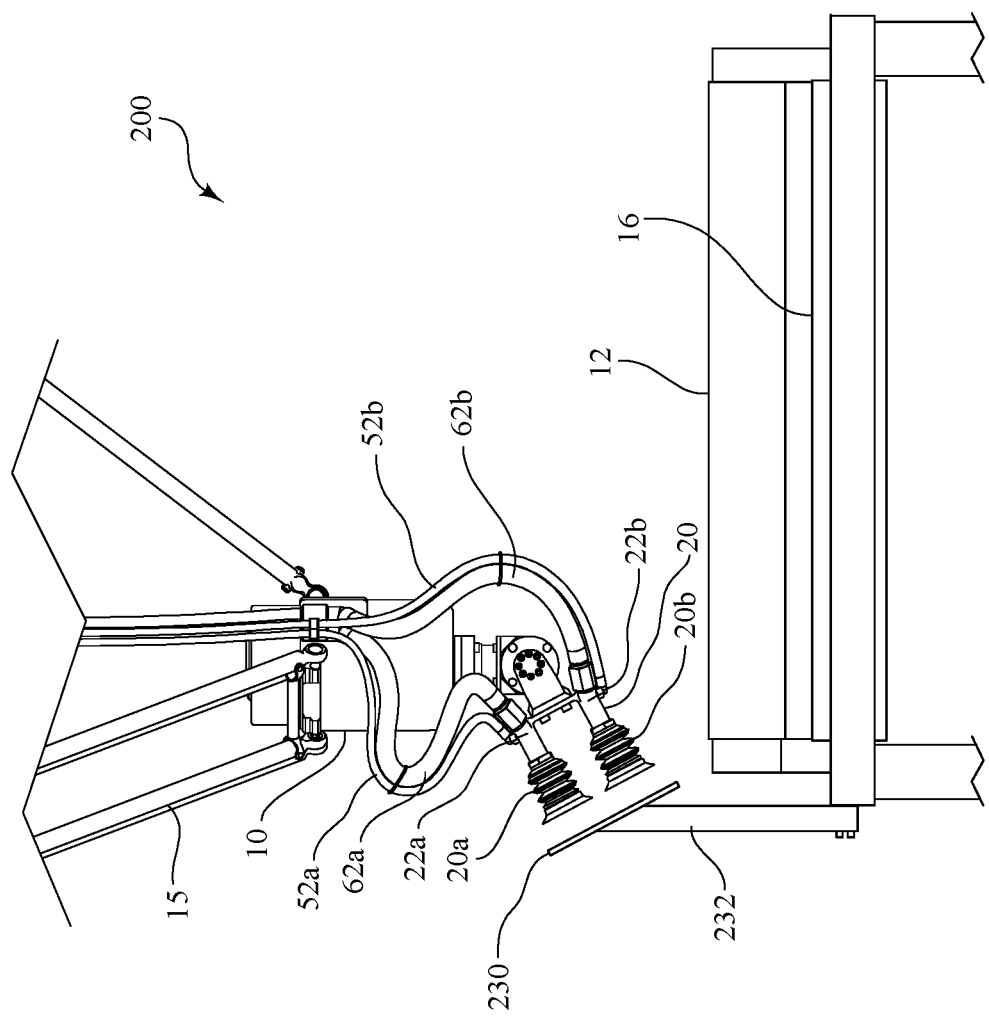
FIG. 3A is a front view of another system for transferring parcels similar to the system for transferring parcels of FIG. 1A, but with the plate mounted in a different orientation as compared to FIG. 1A.

FIGS. 3A and 3B are partial perspective views of another system for transferring parcels (or parcel transfer system) 200.

Referring now to FIGS. 3A and 3B, the parcel transfer system 200 in this exemplary embodiment is identical to that of the parcel transfer system 100 described herein with reference to FIGS. 1A-1C, except the plate 230 is vertically oriented at a predetermined angle relative to the picking surface 14a of the pick conveyor 14 and/or a place surface 16a of the place conveyor 16, in this case, via arm 232. (In this regard, like components are provided with like reference numerals throughout the present disclosure.) As shown, in this exemplary embodiment, the plate 230 is mounted at a steep angle (e.g., ≥45° relative to the plane on which the picking surface 14a and/or place surface 16a is located) to prevent dust buildup that may hinder or prevent sealing of the lips of the vacuum cups 20a, 20b, 20c, 20d with the plate 230, and thus adversely affect the ability of the damage detection system to accurately assess the condition or absence of the vacuum cups 20a, 20b, 20c, 20d of the vacuum-based end effector 20.

Although not shown, alternative embodiments are also contemplated in which the plate 30, 230 is mounted in a manner which permits a predetermined degree of movement of the plate 30, 230 as the vacuum cups 20a, 20b, 20c, 20d are brought into contact with the plate 30, 230 to better replicate the deformation (or give) which may occur as the vacuum cups 20a, 20b, 20c, 20d come into contact with and engage parcels during normal operation of the parcel transfer system 100, 200. To permit such movement, in some embodiments, the plate 30, 230 may be mounted in a floating arrangement (e.g., spring-loaded) relative to a securing member (bracket, frame, etc.).

Although not shown, alternative embodiments are also contemplated in which the plate 30, 230 defines, and thus may be characterized as including, one or more calibration holes. In such embodiments, the one or more calibration holes permit an inflow of air from the environment to be drawn into the vacuum cups 20a, 20b, 20c, 20d when the vacuum cups 20a, 20b, 20c, 20d are engaged with the plate 30, 230 and a suction force is applied, in order to simulate and account for air leakage typically observed when the vacuum cups 20a, 20b, 20c, 20d engage an imperfect parcel surface. That is, the one or more calibration holes help to simulate typical air leakage that occurs as result of the vacuum cups engaging a wrinkled, non-flat, porous, or other surface of a parcel that prevents the vacuum cups 20a, 20b, 20c, 20d from forming a perfect (i.e., airtight) seal with the parcel.

Referring now to FIGS. 1A-1C, 2, 3A, and 3B, the control subsystem 50 of the damage detection system includes: one or more sensors configured to obtain readings that are indicative of the vacuum cups 20a, 20b, 20c, 20d engagement with the plate 30, 230 or lack thereof; and a controller 54 that is operably connected to the one or more sensors, such that readings obtained by the one or more sensors are communicated to the controller 54 for subsequent processing, as further described below. The controller 54 includes a processor 56 configured to execute instructions stored in a memory component 58 or other computer-readable medium to perform various operations described herein for the controller 54, including those of the damage detection routine described below with reference to FIG. 4.

Referring still to FIGS. 1A-1C, 2, 3A, and 3B, the one or more sensors are configured to obtain readings which are indicative of the engagement of the vacuum cups 20a, 20b, 20c, 20d with the plate 30, 230 when the vacuum cups 20a, 20b, 20c, 20d are provided with a suction force by a vacuum source 60 and the robot singulator 10 is in the predetermined position or when the vacuum cups 20a, 20b, 20c, 20d are moved away from the predetermined position. The one or more sensors may obtain readings substantially continuously or be selectively activated to obtain readings based on communications from the controller 54. Accordingly, in some embodiments, the one or more sensors and the controller 54 may be operably connected to the controller 54, such that the controller 54 can communicate instructions which selectively activate the one or more sensors to obtain readings.

Referring still to FIGS. 1A-1C, 2, 3A, and 3B, in this exemplary embodiment, each sensor of the one or more sensors is a vacuum sensor 52a, 52b, 52c, 52d configured to obtain readings indicative of the amount of vacuum pressure, if any, exhibited within one of the vacuum cups 20a, 20*b*, 20*c*, 20*d* to which the vacuum sensor is operably connected while that vacuum cup is provided with a suction force by the vacuum source 60. Specifically, in this exemplary embodiment, the control subsystem 50 includes a vacuum sensor 52*a*, 52*b*, 52*c*, 52*d* for each vacuum cup 20*a*, 20*b*, 20*c*, 20*d* carried by the vacuum-based end effector 20. Accordingly, in this exemplary embodiment, the control subsystem 50 includes a total of four vacuum sensors: a first vacuum sensor 52*a* operably connected to the first vacuum cup 20*a* by virtue of being positioned in a first sensor port 22*a* (FIGS. 1A-1C, 3A, and 3B) that is in fluid communication with the first vacuum cup 20*a*; a second vacuum sensor 52*b* operably connected to the second vacuum cup 20*b* by virtue of being positioned in a second sensor port 22*b* (FIGS. 1A-1C, 3A, and 3B) that is in fluid communication with the second vacuum cup 20*b*; a third vacuum sensor 52*c* operably connected to the third vacuum cup 20*c* by virtue of being positioned in a third sensor port (not shown) that is in fluid communication with the third vacuum cup 20*c*; and a fourth vacuum sensor 52*d* operably connected to the fourth vacuum cup 20*d* by virtue of being positioned in a fourth sensor port (not shown) that is in fluid communication with the fourth vacuum cup 20*d*. Although not shown, the third sensor port and the fourth sensor port are identical in construction to the first sensor port 22*a* and the second sensor port 22*b*.

Referring still to FIGS. 1A-1C, 2, 3A, and 3B, each vacuum cup 20*a*, 20*b*, 20*c*, 20*d* is in fluid communication with the vacuum source 60 via a vacuum hose 62*a*, 62*b*, 62*c*, 62*d*. In this exemplary embodiment, the controller 54 is also operably connected to the vacuum source 60, such that pump readings from the vacuum source 60 are communicated to the controller 54 for subsequent processing, and the controller 54 can communicate instructions (signals) to the vacuum source 60 which regulate operation of the vacuum source 60, the importance of which is further described below. Preferably, the construction of the vacuum source 60 is such that the vacuum source 60 can be selectively activated (e.g., in response to instructions (signals) communicated from the controller 54) to apply a suction force to all or only select ones of the vacuum cups 20*a*, 20*b*, 20*c*, 20*d* in fluid communication therewith. Accordingly, although primarily described herein in singular form, it is appreciated that the present application contemplates both embodiments in which the vacuum source 60 comprises a single vacuum source, as well as embodiments in which the vacuum source 60 comprises multiple vacuum sources. For instance, in some embodiments, the vacuum source 60 may comprise a single vacuum source 60 which regulates the suction force applied to each individual vacuum cup 20*a*, 20*b*, 20*c*, 20*d* at a given time, while, in other embodiments the vacuum source 60 may comprise multiple vacuum sources corresponding to the number of vacuum cups 20*a*, 20*b*, 20*c*, 20*d* carried by the vacuum-based end effector 20. In this exemplary embodiment, each parcel transfer system 100, 200 also includes a pneumatic device configured to direct a stream of air (or blowing force), the importance of which is further descried below. In this exemplary embodiment, the vacuum source 60 acts as such pneumatic device. Embodiments in which such pneumatic device is a separate component (i.e., not part of the vacuum source) and operably connected to the controller 54, such that the controller 54 can communicate instructions to affect operation thereof are, however, also contemplated herein.

Referring now specifically to FIG. 2, in this exemplary embodiment, the control subsystem 50 further includes a speaker 80 and a display 90. Both the speaker 80 and the display 90 are operably connected to the controller 54, such that the controller 54 can selectively communicate audible alerts via the speaker 80 and/or visual alerts via the display 90 to alert individuals within the sorting facility as to the condition of the respective vacuum cups 20*a*, 20*b*, 20*c*, 20*d* of the vacuum-based end effector 20.

Referring now again to FIGS. 1A-1C and 2, in this exemplary embodiment, the parcel transfer system 100 described herein includes, and the control subsystem 50 of the exemplary damage detection system works in conjunction with, one or more cameras 66, 68 and a motor control system 70 for the robot singulator 10. The one or more cameras 66, 68 of the parcel transfer system 100 are operably connected to the controller 54 and provide input data to the controller 54 which enables the controller 54 to detect the presence of objects in the areas of the parcel transfer system 100 in which the robot singulator 10 is operating. In this regard, the one or more cameras 66, 68 are configured to acquire images of at least one of the plate 30, the pick conveyor 14, and the place conveyor 16, such that the images acquired by the one or more cameras 66, 68 or data corresponding thereto are communicated to the controller 54 for subsequent processing, as further described below. The one or more cameras 66, 68 may acquire images substantially continuously or in response to instructions (signals) communicated from the controller 54. Accordingly, in some embodiments, the controller 54 and the one or more cameras 66, 68 may be operably connected such that the controller 54 can communicate instructions which selectively activate the one or more cameras 66, 68 to acquire images. As shown in FIGS. 1A-1C, in this exemplary embodiment, the one or more cameras 66, 68 includes: a first camera 66 positioned so that the field of view of the first camera 66 (as indicated in dashed lines) includes the plate 30; and a second camera 68 positioned so that the field of view of the second camera 68 (as indicated in dashed lines) includes the picking surface 14*a* of the pick conveyor 14 and a place surface 16*a* of the place conveyor 16 onto which parcels transferred from the picking surface 14*a* are deposited. For clarity, the first camera 66 and dashed lines indicating the field of view thereof are omitted in FIGS. 1B and 1C.

Referring now again to FIGS. 1A-1C and 2, each camera of the one or more cameras 66, 68 of the parcel transfer system 100 may be a standalone camera or a component of a larger vision unit, such as those described in U.S. Patent Application Publication No. 2021/0395023, which, again, is incorporated herein by reference. Suitable cameras for use in the parcel transfer system 100 described herein include three-dimensional image sensors manufactured and distributed by ifm Effector Inc. of Malvern, Pa.

In FIGS. 3A and 3B, the first camera and the second camera are not shown. However, it should be appreciated that cameras could be similarly positioned in this exemplary embodiment so as to have a field of view consistent with that described above for the parcel transfer system 100 of FIGS. 1A-1C Referring now again specifically to FIG. 2, the control subsystem 50 works in conjunction with the motor control system 70 for the robot singulator 10 in the same manner as described in U.S. Pat. Nos. 10,646,898 and 10,994,309, which have been incorporated herein by reference. In this regard, the motor control system 70 is operably connected to and controls the movement of the robot singulator 10, and the controller 54 is operably connected to the motor control system 70, such that the controller 54 can communicate instructions (signals) to the motor control system 70, which ultimately informs the manner in which the robot singulator 10 is moved.

Figure 4:
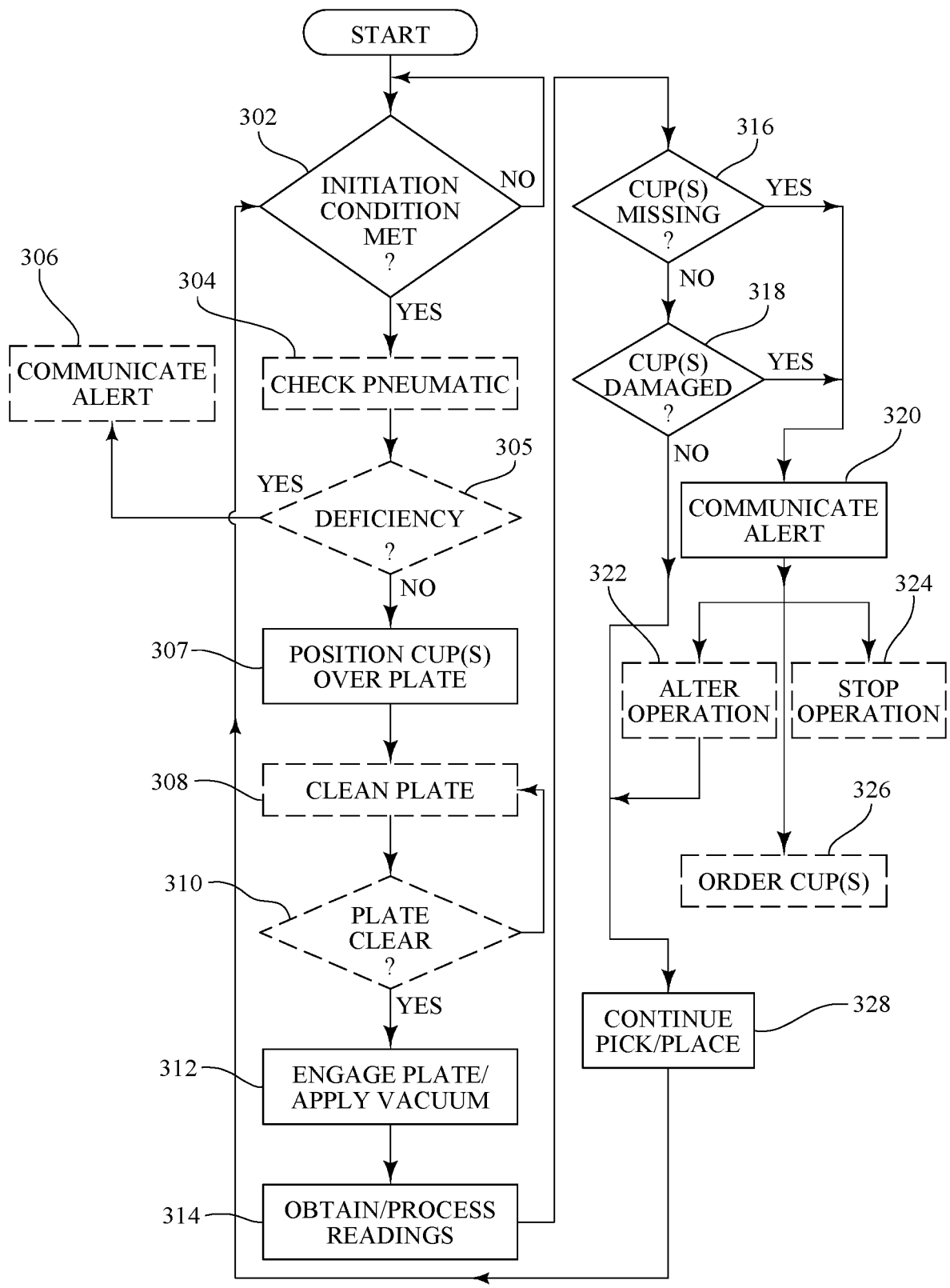
FIG. 4 is an exemplary routine for detecting vacuum cup damage in the systems for transferring parcels of FIGS. 1A and 3A.

FIG. 4 is an exemplary routine for detecting vacuum cup damage (or damage detection routine) in the parcel transfer systems 100, 200 described above with reference to FIGS. 1A-1C, 2, 3A, and 3B.

Referring now to FIGS. 2 and 4, the damage detection routine is carried out in response to a predetermined triggering (or initiation) condition being satisfied, indicating that vacuum cups 20a, 20b, 20c, 20d of the vacuum-based end effector 20 should be tested prior to the robot singulator 10 transferring any additional parcels from the pick conveyor 14 to the place conveyor 16. As indicated by decision 302 in FIG. 4, the damage detection routine thus commences with the controller 54 of the control subsystem 50 determining whether the initiation condition is satisfied. To minimize downtime with respect to the transfer of parcels from the pick conveyor 14 to the place conveyor 16, the initiation condition is preferably based on and relates to, at least partially, the presence or transfer of parcels within the parcel transfer system 100, 200. For instance, as to not unnecessarily delay the robot singulator 10 from transferring parcels loaded onto the pick conveyor 14 to the place conveyor 16, in one embodiment, the initiation condition corresponds to the picking surface 14a being free of parcels. In this embodiment, as a precursor to decision 302, the controller 54 receives one or more images acquired by the first camera 66 and processes the same to detect the presence or absence of parcels on the pick conveyor 14. Upon detecting the presence of a parcel on the pick conveyor 14, the controller 54 will determine that the initiation condition has not been satisfied, and the foregoing process will be repeated until the controller 54 receives and processes an image from the first camera 66 indicative of no parcels being located on the pick conveyor 14. Conversely, upon detecting an absence of parcels on the pick conveyor 14, the controller 54 will determine that the initiation condition has been satisfied and proceed with the next step in the damage detection routine. In embodiments in which the above-described initiation condition is employed, it is generally preferred that the first camera 66 substantially continuously acquire and transmit images to the controller 54.

Referring still to FIGS. 2 and 4, in another embodiment, the initiation condition corresponds to the robot singulator 10 dropping or otherwise failing to successfully transfer a predetermined number (or count value) of parcels from the pick conveyor 14 to the place conveyor 16. In this embodiment, as a precursor to decision 302 and as a parcel is transferred or is attempted to be transferred by the robot singulator 10, the controller 54 determines whether a parcel located on the pick conveyor 14 and engaged by the robot singulator 10 is subsequently transferred and offloaded onto the place conveyor 16. To this end, the controller 54 receives and compares one or more images acquired by the first camera 66 corresponding to the robot singulator 10 engaging or attempting to engage the parcel to one or more images later acquired by the second camera 68 to determine whether the parcel was delivered to the place conveyor 16 generally and/or within a predetermined period of time the robot singulator 10 engaging with or attempting to engage with the parcel. The foregoing process is repeated until the controller 54 determines a number of parcels equal to the count value has not been successfully transferred to the place conveyor 16, at which time, the controller 54 will determine the initiation condition has been satisfied and proceed in the next step of the damage detection routine. In embodiments, in which the above-described initiation condition is employed, it is generally preferred that the first camera 66 and the second camera 68 substantially continuously acquire and transmit images to the controller 54.

Referring still to FIGS. 2 and 4, in yet another embodiment, the damage detection routine occurs at predetermined time intervals. That is, in such embodiment, the initiation condition is satisfied when the controller 54 determines, e.g., based on a clock (not shown) associated with or operably connected to the processor 56, that the time at which the damage detection routine is scheduled to occur has arrived.

Although the initiation condition is generally described above as being a single condition, it should be appreciated that embodiments in which multiple conditions must occur prior to the controller 54 determining that the initiation condition has been satisfied as well as embodiments in which only one condition of a plurality of possible conditions must occur prior to the controller 54 determining that the initiation condition has been satisfied are also contemplated herein. For instance, in one embodiment, the controller 54 may be programmed to determine that the initiation condition is satisfied upon a determination that no parcels are present on the pick conveyor 14 and a predetermined period of time has passed since initiation of the parcel transfer system 100, 200 or since the damage detection routine was last carried out to completion. In another embodiment, the controller 54 may be programmed to determine that the initiation condition is satisfied upon a determination that any one of the three initiation conditions described above (i.e., the pick conveyor 14 being free of parcels, a predetermined number of failed parcel transfer attempts, or the occurrence of predetermined time intervals) is satisfied. Furthermore, it should be appreciated that the initiation condition is not limited to those described herein, but, rather, can be tailored by programming of the controller 54 to accommodate different sorting applications or environments.

Referring still to FIGS. 2 and 4, it is appreciated that the readings obtained by the one or more sensors, which, as further described below, are used to determine whether the vacuum cups 20a, 20b, 20c, 20d of the vacuum-based end effector 20 are damaged or missing, can be adversely affected due to deficiencies in the application of the suction force (negative air pressure) supplied to the vacuum cups 20a, 20b, 20c, 20d (e.g., clogged vacuum hose lines 62a, 62b, 62c, 62d or malfunctions in the vacuum source 60). In this exemplary embodiment, after determining the initiation condition has been satisfied, a pneumatic check subroutine is carried out to determine whether there are any deficiencies in the pneumatics or pneumatic pathways of the parcel transfer system 100, 200, as indicated by block 304 and decision 305 in FIG. 4. During the pneumatic check subroutine, the controller 54 communicates instructions which, if the vacuum source 60 is operating correctly, causes the vacuum source 60 to draw a vacuum to provide the vacuum cups 20a, 20b, 20c, 20d with a suction force while not in the predetermined position (i.e., not engaged with the plate 30). At this time, the vacuum sensor 52a, 52b, 52c, 52d of each respective vacuum cup 20a, 20b, 20c, 20d obtains readings which are subsequently received and processed by the controller 54 to determine if there is a deficiency with respect to operation of the vacuum source 60 or vacuum hose lines 62a, 62b, 62c, 62d of the parcel transfer system 100, 200, as indicated by decision 307 in FIG. 4. In this exemplary embodiment, such comparison is made by way of comparison testing. That is, the readings obtained by the controller 54 from the vacuum sensors 52a, 52b, 52c, 52d are compared against predetermined values indicative of whether there vacuum source 60 and vacuum hose lines 62a, 62b, 62c, 62d are operating correctly.

As shown in FIG. 4, if the readings received from the vacuum sensors 52a, 52b, 52c, 52d are the same or similar (i.e., within a predetermined range of error) as the predetermined values indicative of normal operation of the vacuum source 60 and vacuum hose lines 62a, 62b, 62c, 62d, the controller 54 will communicate instructions which cause the next step of the damage detection routine to be carried out. Conversely, if the readings received are not the same or similar as the predetermined values indicative of normal operation, the controller 54 will communicate an audible alert via the speaker 80 and/or visual alert via the display 90 to alert an operator of the parcel transfer system 100, 200 to the deficiency with the vacuum source 60 and/or vacuum hose lines 62a, 62b, 62c, 62d, as indicated by block 306 in FIG. 4. In addition to communicating the audible alert and visual alert, the controller 54 may, in some embodiments also communicate instructions which stop operation of the upstream conveyor 12, the pick conveyor 14, the place conveyor 16, and/or robot singulator 10. In this regard, embodiments are thus contemplated in which the controller 54 of the control subsystem 50 is further operably connected to the upstream conveyor 12, the pick conveyor 14, and/or the place conveyor 16, such that the controller 54 can communicate instructions which regulate the operation of such components.

Referring now to FIGS. 1B, 1C, 2, 3A, 3B, and 4, in this exemplary embodiment, to test for vacuum cup damage or absence in the vacuum-based end effector 20, the controller 54 communicates instructions which cause the robot singulator 10 to move to the predetermined position so that at least one of the vacuum cups 20a, 20b, 20c, 20d, if present, is in contact with the plate 30, 230 subsequent to determining that there are no deficiencies with respect to the operation of the vacuum source 60 and/or vacuum hose lines 62a, 62b, 62c, 62d. As shown in FIGS. 1C and 3B, in this implementation, each of the vacuum cups 20a, 20b, 20c, 20d of the vacuum-based end effector 20 are tested simultaneously. Accordingly, in this implementation, the predetermined position corresponds to a single position in which each of the vacuum cups 20a, 20b, 20c, 20d of the vacuum-based end effector 20, if present, are in contact with the plate 30, 230. It should be appreciated, however, that, in alternative implementations, each of the vacuum cups 20a, 20b, 20c, 20d of the vacuum-based end effector 20 may be tested independently, and, as such, in some implementations, the predetermined position may correspond to multiple positions in which one of the vacuum cups 20a, 20b, 20c, 20d of the vacuum-based end effector 20, if present, is in contact with the plate 30, 230.

Referring still to FIGS. 1B, 1C, 2, 3A, 3B, and 4, after contacting the plate 30, 230, the controller 54 communicates instructions which activate the vacuum source 60 to provide the vacuum cups 20a 20b, 20c, 20d with a suction force, thus causing the vacuum cups 20a, 20b, 20c, 20d, if present and in good condition to form a seal with the plate 30, 230 that permits a buildup of vacuum pressure within the vacuum cups 20a, 20b, 20c, 20d. In this implementation, movement of the robot singulator 10 to the predetermined position is divided into two distinct steps: a first step in which the controller 54 communicates instructions which causes the robot singulator 10 to move the vacuum cups 20a, 20b, 20c, 20d of the vacuum-based end effector 20 to a position over the plate 30, 230, as shown in FIGS. 1B and 2A and indicated by block 307 in FIG. 4; and a second step in which the controller 54 communicates instructions which cause the robot singulator 10 to move the vacuum cups 20a, 20b, 20c, 20d to the predetermined position, and thus into engagement with the plate 30, 230, as shown in FIGS. 1C and 3B and indicated by block 312 in FIG. 4. To better ensure a seal between the plate 30, 230 and the vacuum cups 20a, 20b, 20c, 20d is achieved, in this implementation, a plate check subroutine (indicated by block 308 and decision 310 in FIG. 4) is carried out after the vacuum cups 20a, 20b, 20c, 20d are positioned above the plate 30, 230, but before being moved to the predetermined position.

Referring still to FIGS. 1B, 1C, 2, 3A, 3B, and 4, during the plate check subroutine, the controller 54 first communicates instructions which cause the pneumatic device, which, as noted above, may be the vacuum source 60 or another device operably connected to the controller 54, to direct a stream of air (or blowing force) onto the plate 30 to clear off any dust or other debris present on the surface of the plate 30 with which the vacuum cups 20a, 20b, 20c, 20d will subsequently engage. One or more images taken by the first camera 66 following the stream of air being directed onto the plate 30 is received and processed by the controller 54 to determine whether the plate 30 is clear of dust and other debris, as indicated by decision 310 in FIG. 4. If the one or more images received and processed by the controller 54 indicate that the plate 30 is clear of dust and other debris, the controller 54 communicates instructions which cause the robot singulator 10 to move the vacuum cups 20a, 20b, 20c, 20d from a position over the plate 30 to the predetermined position, as shown by viewing FIGS. 1B and 1C in sequence and FIGS. 3A and 3B in sequence. Conversely, if the one or more images received and processed by the controller 54 do not indicate that the plate 30 is clear of dust and other debris, the plate check subroutine will be repeated until one or more images indicating that the plate 30 is clear is received and processed by the controller 54.

Although generally preferred to optimize operation of both the damage detection system and parcel transfer system 100, 200 as a whole, it should be appreciated that the pneumatic check subroutine and the plate check subroutine are optional features of the damage detection routine; hence, the blocks and decisions corresponding to such subroutines are illustrated in broken lines in FIG. 4. Accordingly, implementations in which one or both of the above-described subroutines are omitted from the damage detection routine are contemplated herein. For example, in one alternative implementation, after determining that the vacuum source and/or vacuum hose lines 62a, 62b, 62c, 62d are free of deficiencies, the controller may communicate a single set of instructions which cause the robot singulator 10 to move directly to the predetermined position.

Referring now specifically to FIGS. 1C, 2, 3B, and 4, once the vacuum cups 20a, 20b, 20c, 20d, if present, are in contact with the plate 30, readings are subsequently obtained by the vacuum sensors 52a, 52b, 52c, 52d and communicated to the controller 54 for processing, as indicated by block 314 in FIG. 4. Based on the readings from the vacuum sensors 52a, 52b, 52c, 52d, the controller 54 then determines whether any one of the vacuum cups 20a, 20b, 20c, 20d are missing or damaged, as indicated by decisions 316 and 318, respectively, in FIG. 4. In this exemplary embodiment, the determination as to whether any one of the vacuum cups 20a, 20b, 20c, 20d is missing and the determination as to whether any one of the vacuum cups 20a, 20b, 20c, 20d is damaged are both made by way of comparison testing. That is, the readings obtained by the controller 54 from the vacuum sensors 52a, 52b, 52c, 52d are compared against predetermined values indicative of whether a vacuum cup is of normal condition, of damaged condition, or is missing from the vacuum-based end effector 20. In this exemplary embodiment, the predetermined values against which the readings obtained by the vacuum sensors 52a, 52b, 52c, 52d are compared comprise values which correspond to a target vacuum pressure level, the time to reach a target vacuum pressure level, and/or vacuum pressure decay. Based on the readings obtained from the vacuum sensors 52a, 52b, 52c, 52d regarding the engagement of the vacuum cups 20a, 20b, 20c, 20d with the plate 30, 230 or lack thereof relative to the predetermined values, the processor 56 of the controller 54 determines whether any of the vacuum cups 20a, 20b, 20c, 20d are damaged or missing. For instance, in some implementations, if the readings obtained by the one or more sensors for a particular vacuum cup is above or below a first predetermined value, the controller 54 will determine that the vacuum cup is damaged, whereas, if such readings are above or below a second predetermined value, the controller 54 will determine that the vacuum cup is missing from the vacuum-based end effector 20 altogether.

In alternative embodiments in which the plate 30, 230 includes one or more calibration holes, the predetermined values against which the readings obtained by the vacuum sensors 52a, 52b, 52c, 52d are compared will account for a predetermined amount or threshold of air leakage that corresponds to the amount of air leakage into the vacuum cups 20a, 20b, 20c, 20d that is typically observed when the vacuum cups 20a, 20b, 20c, 20d engage an imperfect parcel surface, thereby enabling the system 100, 200 to better discern whether the vacuum cups 20a, 20b, 20c, 20d are simply engaging an imperfect parcel surface where some degree of leakage is expected or are actually damaged or missing.

Referring still to FIGS. 1C, 2, 3B, and 4, with respect to the potential predetermined values against which the readings obtained by the one or more vacuum sensors 52a, 52b, 52c, 52d may be compared, in some implementations, the target vacuum pressure level may be based, at least in part, on the pump level of the vacuum source 60. Accordingly, as noted above, the controller 54 may be further operably connected to the vacuum source 60, such that the pump level of the vacuum source 60 is communicated to the controller 54 for subsequent processing while the vacuum source 60 provides a suction force to the vacuum cups 20a, 20b, 20c, 20d. The time level to reach a target vacuum pressure level may be based on predetermined average times for vacuum cups in normal condition and in damaged condition to reach a target vacuum pressure level. In some implementations, vacuum pressure decay may be based on the time it takes for the vacuum pressure level within a vacuum cup to transition from a first set point consistent with a high vacuum pressure level to a second set point of a lower vacuum pressure level (e.g., 50% of the first set point). Implementations are also contemplated in which the readings obtained for each respective vacuum sensor 52a, 52b, 52c, 52d may be compared to those of the other vacuum sensors, thus enabling the performance of the vacuum cups 20a, 20b, 20c, 20d of the vacuum-based end effector 20 to be compared against one another by the controller 54. In this regard, such comparison may be an additional or alternative means of assessing vacuum cup damage or absence in the vacuum-based end effector 20.

Referring now specifically to FIGS. 2 and 4, in this implementation, upon determining one or more of the vacuum cups 20a, 20b, 20c, 20d is damaged or absent from the vacuum-based end effector 20, the controller 54 communicates an audible alert and/or a visual alert to the speaker 80 and/or the display 90, respectively, to alert an operator within the sorting facility that one or more vacuum cups 20a, 20b, 20c, 20d of the vacuum-based end effector 20 need repaired or replaced, as indicated by block 322 in FIG. 4. In this implementation, upon determining that one or more of the vacuum cups 20a, 20b, 20c, 20d is damaged or absent from the vacuum-based end effector 20, the controller 54 is configured to transmit an order to a retailer, e.g., by way of a known network connection using known interfaces and protocols, for replacement vacuum cups corresponding to those which are damaged or missing, as indicated by block 326 in FIG. 4.

Referring still to FIGS. 2 and 4, as noted above, in this exemplary embodiment, the controller 54 is operably connected to the vacuum source 60 providing suction to the vacuum cups 20a, 20b, 20c, 20d. In this regard, the controller 54 can communicate instructions (signals) to the vacuum source 60 which regulate the operation thereof. As shown in FIG. 4, in this implementation, subsequent to determining that a subset or all of the vacuum cups 20a, 20b, 20c, 20d are damaged or missing, the controller 54 is configured to either alter or cease the operation of the robot singulator 10, as indicated by blocks 322 and 324 in FIG. 4. Specifically, in this implementation, the controller 54 is configured to alter the operation of the robot singulator 10 in instances where only a subset of the vacuum cups 20a, 20b, 20c, 20d are damaged or missing by communicating instructions which cause the vacuum source 60 to cease providing suction to each vacuum cup determined to be damaged or missing while still providing suction to the vacuum cups 20a, 20b, 20c, 20d which are not damaged, as indicated by block 322. Accordingly, in embodiments in which the vacuum source 60 comprises multiple vacuum sources, the instructions communicated by the controller 54 in such instances may be such as to selectively deactivate (i.e., cease operation) each vacuum source within the parcel transfer system 100, 200 corresponding to a vacuum cup determined by the controller 54 to be damaged or missing. It is contemplated, however, that, in some implementations, there may be instances where the vacuum source or vacuum sources corresponding to damaged vacuum cups are selectively reactivated to provide suction so that the damaged vacuum cups can assist in lifting larger and/or heavier parcels. In instances where each vacuum cup carried by the vacuum-based end effector 20 is determined to be damaged or missing, the controller 54 is configured to communicate instructions which cause the vacuum source 60 and the robot singulator 10 (e.g., by communicating instructions to the motor control system 70) to cease operation so that the damaged and/or missing vacuum cups can be repaired or replaced, as indicated by block 324 in FIG. 4. Of course the nature of the instructions communicated from the controller 54 to the vacuum source 60 in response to determining one or more of the vacuum cups 20a, 20b, 20c, 20d are damaged or missing can be tailored via programming of the controller 54 to accommodate different sorting applications or environments.

Referring still to FIGS. 2 and 4, following either the alteration of the operation of the robot singulator 10 or a determination that none of the vacuum cups 20a, 20b, 20c, 20d are damaged or missing, the controller 54 communicates instructions (e.g., to the motor control system 70) which cause the robot singulator 10 to resume transferring parcels from the pick conveyor 14 to the place conveyor 16, as indicated by block 328 in FIG. 4. The damage detection routine can subsequently be repeated in the manner described above until operation of the parcel transfer system 100, 200 has ceased.

It should be appreciated that routine and subroutines described herein correspond to a set of instructions that are stored in the memory component.

Figure 5:
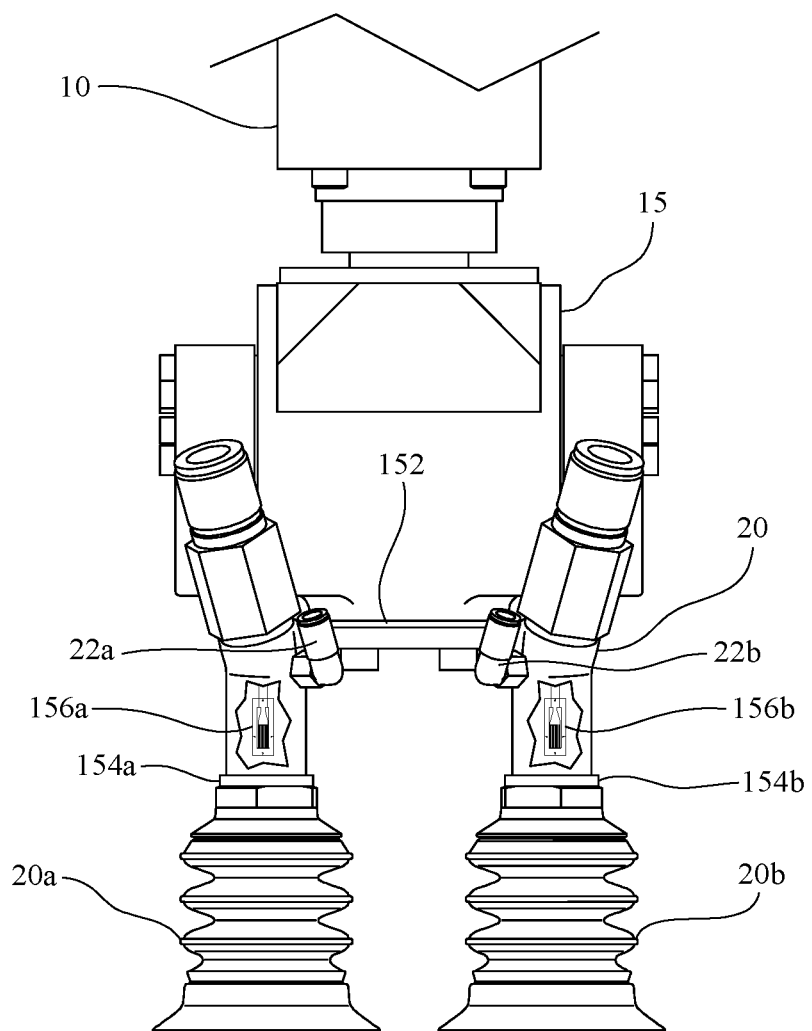
FIG. 5 is a partial view of the robot singulator of the systems for transferring parcels of FIGS. 1A and 3A, but equipped with an alternative set of sensors.

FIG. 5 is a partial view of the robot singulator 10, but equipped with an alternative set of sensors as compared to the vacuum sensors 52a, 52b, 52c, 52d shown in FIGS. 1A-1C, 3A, and 3B.

Referring now to FIGS. 2 and 5, although the one or more sensors of the parcel transfer systems 100, 200 are primarily described above as being vacuum sensors 52a, 52b, 52c, 52d, it should be appreciated that the one or more sensors are not so limited. For instance, as shown in FIG. 5, in this embodiment, instead of a plurality of vacuum sensors 52a, 52b, 52c, 52d, the control subsystem 50 utilizes a plurality of load cells 152, 154a, 154b that are operably connected to the controller 54 and configured to acquire readings indicative of the pulling force required to break the seal, if one exists, formed between the vacuum cups 20a, 20b, 20c, 20d and the plate 30, 230. Specifically, in this exemplary embodiment, the control subsystem 50 includes a single load cell 152 that is sandwiched, and thus may be characterized as providing an interface, between the vacuum-based end effector 20 and the portion of the framework 15 to which the vacuum-based end effector 20 is mounted. As shown, the control subsystem 50 also includes a number of additional load cells 154a, 154b equal to the number of vacuum cups 20a, 20b, 20c 20d (two of which are shown in FIG. 5) which are sandwiched, and thus may be characterized as providing an interface, between the vacuum cups 20a, 20b, 20c, 20d and the portion of the vacuum-based end effector 20 to which the vacuum cups 20a, 20b, 20c, 20d are mounted. In this embodiment, the control subsystem 50 also includes a number of strain gauges 156a, 156b equal to the number of vacuum cups 20a, 20b, 20c, 20d (two of which are shown in FIG. 5) which are operably connected to the controller 54 and are configured to obtain readings indicative of the flex occurring in the vacuum-based end effector 20 as the robot singulator 10 is moved away from the predetermined position after the vacuum cups 20a, 20b, 20c, 20d have, or should have, formed a seal with the plate 30, 230.

Referring still to FIGS. 2 and 5, in this embodiment, the determination as to whether any one of the vacuum cups 20a, 20b, 20c, 20d is missing and the determination as to whether any one of the vacuum cups 20a, 20b, 20c, 20d is damaged are also both made by way of comparison testing. That is the readings obtained by the controller 54 from the plurality of load cells 152, 154a, 154b and strain gauges 156a, 156b are compared against predetermined values indicative of whether a vacuum cup is of normal condition, of damaged condition, or is missing from the vacuum-based end effector 20. In this embodiment, the predetermined values against which the plurality of load cells 152, 154a, 154b are compared comprise values which correspond to target forces required to pull the vacuum cups 20a, 20b, 20c, 20d away from the plate 30, 230 (i.e., break the seal) while the vacuum source 60 is activated and the vacuum cups 20a, 20b, 20c, 20d are engaged therewith. In this embodiment, the predetermined values against which the plurality of strain gauges 156a, 156b are compared comprise values which correspond to target forces acting upon the vacuum-based end effector 20 as the robot singulator 10 is moved away from the predetermined position after the vacuum cups 20a, 20b, 20c, 20d have, or should have, formed a seal with the plate 30.

In embodiments utilizing the plurality of load cells 152, 154a, 154b and the plurality of strain gauges 156a, 156b, damage to or the absence of the vacuum cups 20a, 20b, 20c, 20d can be determined by carrying out the steps of the damage detection routine of FIG. 4 in similar fashion as described, except that readings received and processed by the controller 54 will correspond to those obtained by the plurality of load cells 152, 154a, 154b and the plurality of strain gauges 156a, 156b and such readings will be obtained as the robot singulator 10 is moved away from the predetermined position while the vacuum source 60 is still active. Embodiments in which the control subsystem 50 includes each of as well as embodiments in which the control subsystem 50 includes only one of the vacuum sensors 52a, 52b, 52c, 52d, the plurality of load cells 152, 154a, 154b, and the plurality of strain gauges 156a, 156b are also contemplated herein. Although not shown, embodiments, in which one or more load cells are additionally or alternatively implemented in the plate 30 are also contemplated herein.

Alternative embodiments are also contemplated in which the one or more sensors includes one or more components of the robot singulator 10 (e.g., one or more servo motors) which provide feedback regarding a force imposed along or about one or more axes of the robot singulator 10 as it is moved away from the predetermined position. In one such embodiment, the controller 54 will determine, as a part of the damage detection routine, whether any of the vacuum cups 20a, 20b, 20c, 20d are damaged or missing based, at least in part, on the readings obtained by the one or more components of the robot singulator 10.

One of ordinary skill in the art will recognize that additional embodiments and implementations are also possible without departing from the teachings of the present invention. This detailed description, and particularly the specific details of the exemplary embodiments and implementations disclosed herein, is given primarily for clarity of understanding, and no unnecessary limitations are to be understood therefrom, for modifications will become obvious to those skilled in the art upon reading this disclosure and may be made without departing from the spirit or scope of the invention.

What is claimed is:

1. A system for detecting vacuum cup damage or absence in a robot singulator including a vacuum-based end effector configured to carry one or more vacuum cups, comprising:
   a plate; and
   a control subsystem, including
      one or more sensors, each sensor of the one or more sensors configured to obtain readings indicative of engagement or non-engagement of a vacuum cup of the one or more vacuum cups with the plate, and
      a controller operably connected to the one or more sensors, the controller including a processor for executing instructions stored in a memory component to (i) receive and process readings from the one or more sensors while the robot singulator is in a predetermined position in which, if present, the one or more vacuum cups is engaged with the plate or moved away from the predetermined position and (ii) determine whether any one of the one or more vacuum cups is damaged or missing based on the readings obtained from the one or more sensors.

2. The system according to claim 1, wherein the one or more sensors comprise one or more vacuum sensors, each vacuum sensor of the one or more vacuum sensors configured to obtain vacuum pressure readings.

3. The system according to claim 1, wherein the one or more sensors comprise one or more components of the robot singulator configured to provide feedback regarding a force imposed along or about one or more axes of the robot singulator as it is moved away from the predetermined position.

4. The system according to claim 1, wherein the one or more sensors comprise at least one of (a) one or more load cells implemented in the robot singulator and (b) one or more strain gauges implemented in the robot singulator.

5. The system according to claim 1,
wherein the controller is operably connected to the robot singulator; and
wherein the processor is configured to execute instructions stored in the memory component to (iii) receive and process readings from the one or more sensors while the robot singulator is not in the predetermined position, and (iv) selectively communicate instructions which cause the robot singulator to move to the predetermined position subsequent to processing the readings received from the one or more sensors while the robot singulator is not in the predetermined position.

6. The system according to claim 1, wherein the plate is vertically oriented at a predetermined angle relative to at least one of (a) a picking surface of a pick conveyor which the robot singulator, in use, removes parcels from and (b) a place surface of a place conveyor on which the robot singulator, in use, deposits parcels.

7. The system according to claim 1,
wherein the control subsystem further includes at least one of (a) a speaker operably connected to the controller and (b) a display operably connected to the controller; and
wherein the processor is configured to execute instructions stored in the memory component to (iii) communicate at least one of an audible alert via the speaker and a visual alert via the display subsequent to a determination that any one of the one or more vacuum cups is damaged or missing.

8. The system according to claim 1, and further comprising:
one or more vacuum sources operably connected to the controller, each vacuum source of the one or more vacuum sources configured to be placed in fluid communication with a vacuum cup of the one or more vacuum cups;
wherein the controller is configured to execute instructions stored in the memory component to (iii) communicate instructions which selectively deactivate each vacuum source of the one or more vacuum sources corresponding to a vacuum cup of the one or more vacuum cups determined to be damaged or missing.

9. The system according to claim 1,
wherein the controller is operably connected to one or more cameras configured to acquire images of at least one of (a) the plate, (b) a pick conveyor from which the robot singulator, in use, removes parcels from, and (c) a place conveyor on which the robot singulator, in use, deposits parcels; and
wherein the processor is configured to execute instructions stored in the memory component to (iii) receive and process images acquired by the one or more cameras, and (iv) selectively communicate instructions which cause the robot singulator to move to the predetermined position based on the images received from the one or more cameras.

10. The system according to claim 9,
wherein the one or more cameras are configured to capture images of the pick conveyor and the place conveyor;
wherein the processor is configured to execute instructions stored in the memory component to (v) determine whether parcels picked from the pick conveyor by the robot singulator are subsequently deposited onto the place conveyor based on the images received from the one or more cameras; and
wherein the processor is configured to execute instructions stored in the memory component corresponding to operations (i) and (ii) subsequent to a determination that a predetermined number of parcels picked from the pick conveyor have not been transferred to the place conveyor.

11. The system according to claim 9,
wherein the one or more cameras are configured to capture images of the pick conveyor;
wherein the processor is configured to execute instructions stored in the memory component to (v) determine whether one or more parcels are located on the pick conveyor based on the images received from the one or more cameras; and
wherein the processor is configured to execute instructions stored in the memory component corresponding to operations (i) and (ii) subsequent to a determination that no parcels are located on the pick conveyor.

12. The system according to claim 9,
wherein the one or more cameras are configured to capture images of the plate;
wherein the processor is configured to execute instructions stored in the memory component to (v) determine whether the plate is clear of debris based on the images received from the one or more cameras; and
wherein the processor is configured to execute instructions stored in the memory component corresponding to operations (i) and (ii) subsequent to a determination that the plate is clear of debris.

13. A parcel transfer system, comprising:
a robot singulator configured to transfer a target parcel from a pick conveyor to a place conveyor, the robot singulator including a vacuum-based end effector configured to carry one or more vacuum cups for engaging the target parcel;
a plate mounted proximate to at least one of the pick conveyor and the place conveyor; and
a control subsystem, including
one or more sensors, each sensor of the one or more sensors configured to obtain readings indicative of engagement or non-engagement of a vacuum cup of the one or more vacuum cups with the plate, and
a controller operably connected to the robot singulator and the one or more sensors, the controller including a processor for executing instructions stored in a memory component to (i) communicate instructions to the robot singulator which cause the robot singulator to move to a predetermined position in which, if present, at least one of the one or more vacuum cups is engaged with the plate, (ii) receive and process readings from the one or more sensors while the robot singulator is in the predetermined position or moved away from the predetermined position, and (iii) determine whether any one of the one or more vacuum cups is damaged or missing based on the readings obtained from the one or more sensors.

14. The parcel transfer system according to claim 13, wherein the one or more sensors comprise one or more vacuum sensors, each vacuum sensor of the one or more vacuum sensors configured to obtain vacuum pressure readings.

15. The parcel transfer system according to claim 13, wherein the one or more sensors comprise one or more components of the robot singulator configured to provide feedback regarding a force imposed along or about one or more axes of the robot singulator as it is moved away from the predetermined position.

16. The parcel transfer system according to claim 13, wherein the one or more sensors comprise at least one of (a) one or more load cells implemented in the robot singulator and (b) one or more strain gauges implemented in the robot singulator.

17. The parcel transfer system according to claim 13, wherein the processor is configured to execute instructions stored in the memory component to (iv) receive and process readings from the one or more sensors while the robot singulator is not in the predetermined position, and detect at least one of a deficiency in operation of a vacuum source with which the one or more vacuum cups, if present, are in fluid communication with and clogging in one or more pneumatic pathways based on the readings obtained by the one or more sensors while the robot singulator is not in the predetermined position.

18. The parcel transfer system according to claim 13, wherein the plate is vertically oriented at a predetermined angle relative to at least one of (a) a picking surface of the pick conveyor and (b) a place surface of the place conveyor.

19. The parcel transfer system according to claim 13,
wherein the control subsystem further includes at least one of (a) a speaker operably connected to the controller and (b) a display operably connected to the controller; and
wherein the processor is configured to execute instructions stored in the memory component to (iv) communicate at least one of an audible alert via the speaker and a visual alert via the display subsequent to a determination that any one of the one or more vacuum cups is damaged or missing.

20. The parcel transfer system according to claim 13, and further comprising:
one or more vacuum sources, each vacuum source of the one or more vacuum sources placed in fluid communication with a vacuum cup of the one or more vacuum cups;
wherein the controller is configured to execute instructions stored in the memory component to (iv) communicate instructions which selectively deactivate each vacuum source of the one or more vacuum sources corresponding to a vacuum cup of the one or more vacuum cups determined to be damaged or missing.

21. The parcel transfer system according to claim 13, and further comprising:
one or more cameras operably connected to the controller and configured to acquire images of at least one of (a) the plate, (b) the pick conveyor, and (c) the place conveyor;
wherein the processor is configured to execute instructions stored in the memory component to (iv) receive and process images acquired by the one or more cameras, and (v) selectively communicate instructions corresponding to operation (i) based on the images received from the one or more cameras.

22. The parcel transfer system according to claim 21,
wherein the one or more cameras are configured to capture images of the pick conveyor and the place conveyor;
wherein the processor is configured to execute instructions stored in the memory component to (vi) determine whether parcels picked from the pick conveyor by the robot singulator are subsequently deposited onto the place conveyor based on the images received from the one or more cameras; and
wherein the processor is configured to execute instructions stored in the memory component corresponding to operations (i), (ii), and (iii) subsequent to a determination that a predetermined number of parcels picked from the pick conveyor have not been transferred to the place conveyor.

23. The parcel transfer system according to claim 21,
wherein the one or more cameras are configured to capture images of the pick conveyor;
wherein the processor is configured to execute instructions stored in the memory component to (vi) determine whether one or more parcels are located on the pick conveyor based on the images received from the one or more cameras; and
wherein the processor is configured to execute instructions stored in the memory component corresponding to operations (i), (ii), and (iii) subsequent to a determination that no parcels are located on the pick conveyor.

24. The parcel transfer system according to claim 21,
wherein the one or more cameras are configured to capture images of the plate;
wherein the processor is configured to execute instructions stored in the memory component to (vi) determine whether the plate is clear of debris based on the images received from the one or more cameras; and
wherein the processor is configured to execute instructions stored in the memory component corresponding to operations (i), (ii), and (iii) subsequent to a determination that the plate is clear of debris.

* * * * *